(12) United States Patent
Yamamoto et al.

(10) Patent No.: US 10,773,935 B2
(45) Date of Patent: Sep. 15, 2020

(54) CONVEYING APPARATUS

(71) Applicant: Kabushiki Kaisha Toshiba, Minato-ku (JP)

(72) Inventors: Daisuke Yamamoto, Kawasaki (JP); Hideki Ogawa, Shinagawa (JP); Takafumi Sonoura, Yokohama (JP); Atsushi Sadamoto, Yokohama (JP); Hiroshi Ohtsu, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 208 days.

(21) Appl. No.: 16/106,234

(22) Filed: Aug. 21, 2018

(65) Prior Publication Data

US 2019/0284033 A1 Sep. 19, 2019

(30) Foreign Application Priority Data

Mar. 15, 2018 (JP) ................... 2018-048221

(51) Int. Cl.
*B66F 7/06* (2006.01)
*B66F 7/08* (2006.01)
*B62B 1/14* (2006.01)

(52) U.S. Cl.
CPC .............. *B66F 7/0658* (2013.01); *B62B 1/14* (2013.01); *B66F 7/0625* (2013.01); *B66F 7/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,894,932 B2 * | 2/2011 | Mountz | ................ | G06Q 10/087 700/214 |
| 7,894,933 B2 * | 2/2011 | Mountz | ................ | G06Q 10/087 700/214 |
| 7,912,574 B2 * | 3/2011 | Wurman | ............ | G05B 19/4189 700/213 |
| 7,920,962 B2 * | 4/2011 | D'Andrea | ........ | G05B 19/41895 700/245 |
| 8,068,978 B2 * | 11/2011 | D'Andrea | ............ | G05D 1/0246 701/414 |

(Continued)

FOREIGN PATENT DOCUMENTS

| | | |
|---|---|---|
| JP | 2011-240781 | 12/2011 |
| JP | 2016-196372 | 11/2016 |
| JP | 2017-119451 | 7/2017 |

*Primary Examiner* — Kyle O Logan
(74) *Attorney, Agent, or Firm* — Oblon, McClelland, Maier & Neustadt, L.L.P.

(57) ABSTRACT

In embodiments, a conveying apparatus includes a base, a wheel, a lifter, a lower side distance detection unit, and a control unit. The wheel is connected to the base via a suspension mechanism and is rotatable. The lifter is able to be lifted and lowered with respect to the base in a direction of a conveyance target. The lower side distance detection unit detects a lower side distance between a reference surface of the base and a ground contact surface of the wheel. The control unit controls a lifting/lowering operation of the lifter and rotative driving of the wheel. The control unit causes the lifter to be lifted and lowered based on the lower side distance and to support a part of a weight of the conveyance target, and causes the wheel to be rotatively driven and to convey the conveyance target.

11 Claims, 10 Drawing Sheets

(56) References Cited

U.S. PATENT DOCUMENTS

| | | | | |
|---|---|---|---|---|
| 8,239,291 B2* | 8/2012 | Hoffman | ............... | G06Q 10/087 |
| | | | | 700/216 |
| 8,483,869 B2* | 7/2013 | Wurman | ............... | B65G 1/1378 |
| | | | | 414/807 |
| 8,538,692 B2* | 9/2013 | Wurman | ................ | G06Q 50/30 |
| | | | | 701/532 |
| 9,008,828 B2* | 4/2015 | Worsley | ............... | G06Q 10/087 |
| | | | | 700/213 |
| 9,278,840 B2* | 3/2016 | Hess | ........................ | B65G 1/00 |
| 9,389,609 B1* | 7/2016 | Mountz | ............ | G05B 19/41895 |
| 2006/0210382 A1* | 9/2006 | Mountz | .................. | B65G 1/137 |
| | | | | 414/498 |
| 2007/0288123 A1* | 12/2007 | D'Andrea | ............... | B66F 9/063 |
| | | | | 700/214 |
| 2008/0166217 A1* | 7/2008 | Fontana | .................. | B66F 9/063 |
| | | | | 414/800 |
| 2008/0167884 A1* | 7/2008 | Mountz | .............. | G06Q 10/0875 |
| | | | | 705/29 |
| 2011/0153063 A1* | 6/2011 | Wurman | ............... | B65F 1/1452 |
| | | | | 700/218 |
| 2012/0143427 A1* | 6/2012 | Hoffman | ................ | G06Q 10/08 |
| | | | | 701/23 |
| 2013/0054005 A1* | 2/2013 | Stevens | ................ | G06Q 10/087 |
| | | | | 700/216 |
| 2013/0103552 A1* | 4/2013 | Hoffman | .............. | G05D 1/0027 |
| | | | | 705/28 |
| 2013/0302132 A1* | 11/2013 | D'Andrea | .............. | G06Q 10/08 |
| | | | | 414/807 |

* cited by examiner

CONVEYING APPARATUS

CROSS-REFERENCE TO RELATED APPLICATIONS

This application is based upon and claims the benefit of priority from Japanese Patent Application No. 2018-048221, filed on Mar. 15, 2018; the entire contents of which are incorporated herein by reference.

FIELD

Embodiments described herein relate generally to a conveying apparatus.

BACKGROUND

A conveying apparatus conveying a cart (conveyance target) loaded with cargo has been developed. There is a demand for a conveying apparatus which is capable of conveying a conveyance target in a stable state even when the weight of the conveyance target is large.

DETAILED DESCRIPTION

In embodiments, a conveying apparatus includes a base, a wheel, a lifter, a lower side distance detection unit, and a control unit. The wheel is connected to the base via a suspension mechanism and is rotatable. The lifter is able to be lifted and lowered with respect to the base in a direction of a conveyance target. The lower side distance detection unit detects a lower side distance between a reference surface of the base and a ground contact surface of the wheel. The control unit controls a lifting/lowering operation of the lifter and rotative driving of the wheel. The control unit causes the lifter to be lifted and lowered based on the lower side distance and to support a part of a weight of the conveyance target, and causes the wheel to be rotatively driven and to convey the conveyance target.

Hereinafter, conveying apparatuses of embodiments will be described with reference to the drawings.

In the conveying apparatuses of the embodiments, an X-direction and a Z-direction are defined as follows. The Z-direction is a vertical direction, and a positive Z-direction is directed vertically upward. The X-direction is a horizontal direction, and a positive X-direction is a conveying direction of a conveyance target. In the following embodiments, an example of a case in which a cart loaded with cargo is a conveyance target will be described.

Figure 1:
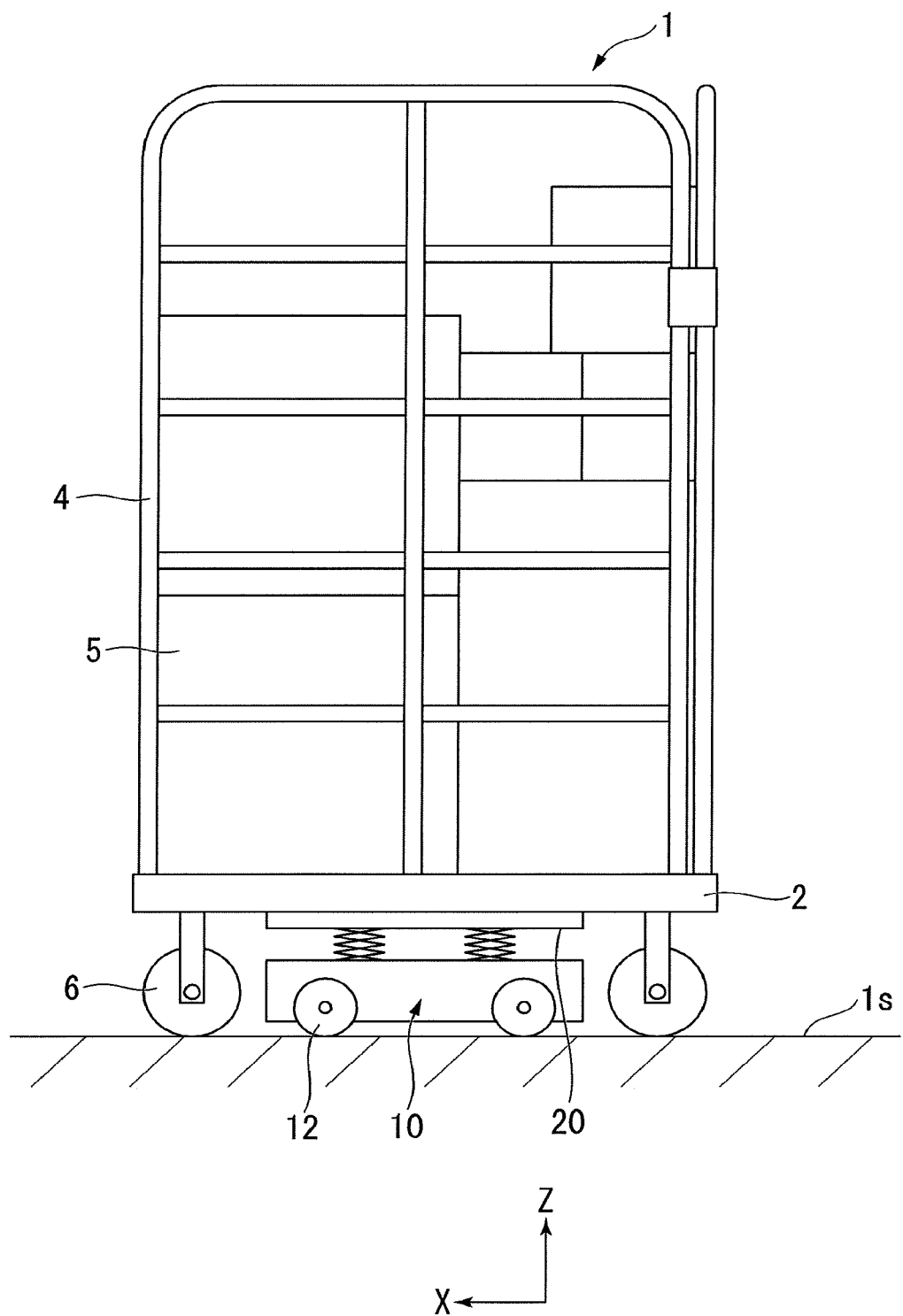
FIG. 1 is a side view of a conveying apparatus conveying a cart.

FIG. 1 is a side view of a conveying apparatus 10 conveying a cart 1. The cart 1 has a bottom plate 2, a frame body 4, and casters 6.

The bottom plate 2 is formed in a rectangular shape when seen in the positive Z-direction. The bottom plate 2 is formed of a metal material such as aluminum, a resin material, or the like.

The frame body 4 is formed by combining rod materials in a lattice shape. The frame body 4 stands up in the positive Z-direction from an edge side on an upper surface of the bottom plate 2. Cargo 5 can be loaded inside the frame body 4.

The casters 6 are rotatably supported on a lower surface of the bottom plate 2.

The conveying apparatus 10 moves along a floor surface is and enters a space between the bottom plate 2 of the cart 1 and the floor surface 1s. The conveying apparatus 10 supports a part of the weight of the cart 1 by using a lifter top plate 20 and conveys the cart 1 by rotatively driving wheels 12.

First Embodiment

With reference to FIG. 2 to FIG. 14, a conveying apparatus 10 of a first embodiment will be described.

Figure 2:
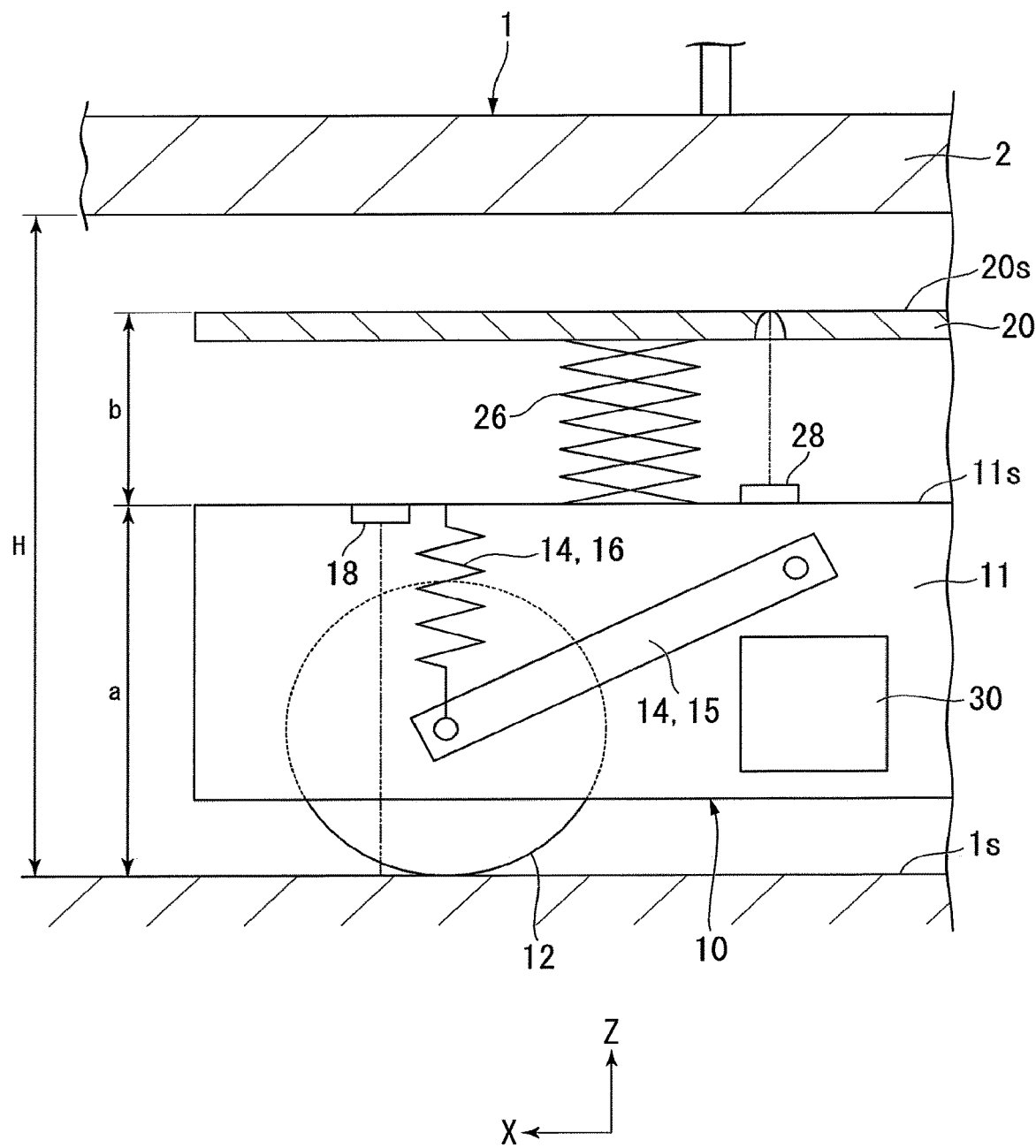
FIG. 2 is a cross-sectional view illustrating an internal configuration of a conveying apparatus of a first embodiment.
Figure 3:
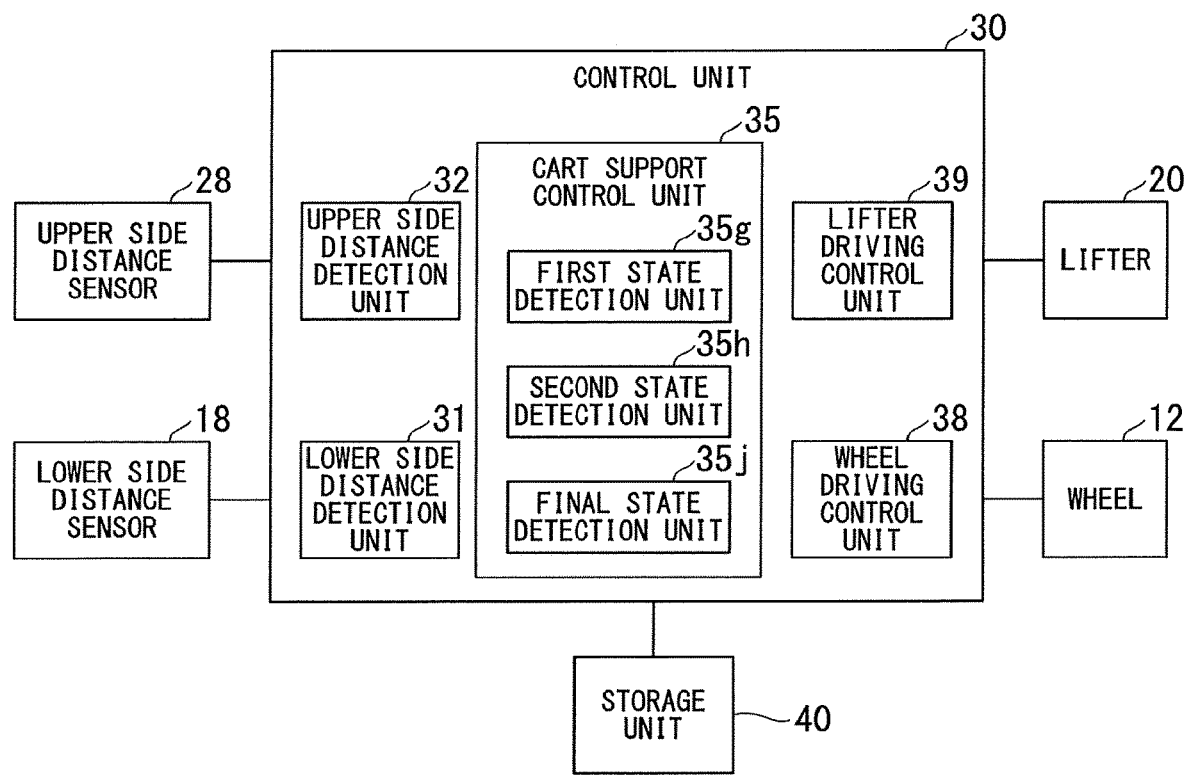
FIG. 3 is a block diagram of the conveying apparatus of the first embodiment.

FIG. 2 is a cross-sectional view illustrating an internal configuration of the conveying apparatus 10 of the first embodiment. FIG. 3 is a block diagram of the conveying apparatus of the first embodiment. As illustrated in FIG. 2, the conveying apparatus 10 has a base 11, the wheels 12, a suspension mechanism 14, a lower side distance sensor 18, the lifter top plate 20, an upper side distance sensor 28, and a control unit 30. As illustrated in FIG. 3, the control unit 30 has a wheel driving control unit 38, a lower side distance detection unit 31, a lifter driving control unit 39, and an upper side distance detection unit 32.

For example, the base 11 is formed in a rectangular parallelepiped shape.

The wheels 12 are connected to the base 11 via the suspension mechanisms 14. The wheel 12 is rotatably supported by an arm 15 of the suspension mechanism 14. The base 11 has a motor (not illustrated) for rotatively driving the wheels 12. The wheel driving control unit 38 controls rotative driving of the wheels 12 by controlling driving of the motor.

The conveying apparatus 10 has a plurality of wheels 12. In the conveying apparatus 10 of the embodiment, four wheels 12 are disposed in the vicinity of four corners of the base 11. For example, the four wheels 12 form Mecanum wheels. The Mecanum wheel has a plurality of barrels on the circumference of the wheel 12. The barrels freely rotate around a rotation axis tilting 45 degrees with respect to an axle of the wheel 12. The Mecanum wheels move the base 11 in any direction by changing the combination of rotation directions or the rotation speeds of the four wheels 12. The four wheels 12 may adopt a general independent two-wheel driving method (two driving wheels and two driven wheels) or may adopt a steering wheel method, called an active caster.

The suspension mechanism 14 is disposed between the base 11 and the wheels 12. The suspension mechanism 14 has the arm 15 and a spring member 16. Additionally, the suspension mechanism 14 may have a damper.

A first end portion of the arm 15 is rotatably connected to the base 11. A second end portion of the arm 15 is connected to the axle of the wheel 12. The arm 15 pivots about the first end portion and restricts a movement direction of the wheels 12 to an upward/downward direction (Z-direction).

The suspension mechanism 14 may directly move upward and downward by using a linear guide, a cylinder, or the like, instead of using the arm 15 which is rotatably connected.

A first end portion of the spring member 16 is connected to the base 11. A second end portion of the spring member 16 is connected to the axle of the wheel 12 or the second end portion of the arm 15. The spring member 16 supports the weights of the base 11 and the lifter top plate 20 acting from the first end portion, and the weight of the cart 1 supported by the lifter top plate 20. The spring member 16 absorbs an impact force acting from the second end portion when the wheels 12 go over an unevenness on the floor surface 1s.

The lower side distance sensor 18 outputs a signal related to a lower side distance a to the lower side distance detection unit 31. The lower side distance a is a distance between a reference surface 11s of the base 11 and the floor surface 1s which is a ground contact surface of the wheels. The reference surface 11s of the base 11 may be arbitrary. For example, an upper surface of the base 11 may serve as the reference surface 11s thereof. For example, when the upper surface of the top plate of the base 11 serves as the reference surface 11s, the lower side distance sensor 18 is disposed on a lower surface of the top plate. The lower side distance a changes due to stretching and shrinking of the spring member 16. Therefore, the lower side distance sensor 18 may be disposed in the vicinity of the first end portion of the spring member 16 or may be installed on the base 11 from which the floor surface 1s can be measured, so that the lower side distance a may be calculated from the distance between an installation surface and the reference surface 11s. The lower side distance sensor 18 may be provided in the vicinity of the spring member 16 of all of the wheels 12 or may be provided in the vicinity of the spring member 16 of some of the wheels 12.

For example, the lower side distance sensor 18 is a position sensitive detector (PSD) sensor. The PSD sensor has a light source, a lens, and a PSD element. Light emitted from the light source is reflected on the floor surface is and is incident on the PSD element. The PSD element has a linearly extending photo-diode and detects the lower side distance a by means of triangulation using relative positional information of the light source, the lens, and the PSD element, and a signal related to the position of light incident on the PSD element. A PSD sensor 18 does not detect the intensity of incident light but detects the position of incident light. Therefore, the PSD sensor 18 outputs an accurate signal regardless of the material or the color of a target. Therefore, the lower side distance detection unit 31 can accurately detect the lower side distance a regardless of the surface state or the color of the floor surface 1s.

The lower side distance sensor 18 may be a distance meter using the phase difference or TOF of a laser. The lower side distance sensor 18 may also be a sensor using ultrasound waves. In addition, the lower side distance sensor 18 may measure movement of the suspension mechanism 14, instead of directly measuring the lower side distance a. For example, when a linear guide or a cylinder is used as the suspension mechanism 14, a linear encoder which can measure the displacement amount of the linear guide or the cylinder may be used. In addition, when a suspension is constituted of a rotation mechanism, an encoder or a potentiometer measuring a rotation angle may be provided at a root part of the rotation axis, and then the lower side distance a may be estimated from the angle thereof.

The lifter top plate 20 is formed in a flat plate shape and is disposed in the positive Z-direction of the base 1L A lifter 26 is disposed between the lifter top plate 20 and the base 11. A first end portion of the lifter 26 is connected to the base 11, and a second end portion is connected to the lifter top plate 20. The lifter top plate 20 is lifted and lowered in a direction of the cart 1 (Z-direction) in accordance with stretching and shrinking of the lifter 26 in the Z-direction. The base 11 has a power source (not illustrated) for causing the lifter 26 to stretch and shrink in the Z-direction. The power source is a motor, an actuator, or the like. The lifter driving control unit 39 controls a lifting/lowering operation of the lifter top plate 20 by controlling driving of the power source. The lifter top plate 20 comes into contact with the bottom plate 2 of the cart 1 and supports the weight of the cart 1. In this application, there are cases in which the lifter top plate 20 and the lifter 26 are generically named as a lifter.

The upper side distance sensor 28 outputs a signal related to an upper side distance b to the upper side distance detection unit 32. The upper side distance b is a distance between the reference surface 11s of the base 11 described above and an upper surface 20s of the lifter top plate 20. For example, when the upper surface of the top plate of the base 11 serves as the reference surface 11s, the upper side distance sensor 28 is disposed the upper surface of the top plate. The upper side distance b changes due to stretching and shrinking of the lifter 26. Therefore, the upper side distance sensor 28 may be disposed in the vicinity of the first end portion of the lifter 26 or may be installed on the base 11 from which the lifter top plate 20 can be measured, so that the upper side distance b may be calculated from the distance between the installation surface and the reference surface 11s.

Similar to the lower side distance sensor 18, for example, the upper side distance sensor 28 is a PSD sensor. The upper side distance sensor 28 may be a distance meter using the phase difference or TOF of a laser. The upper side distance sensor 28 may also be a sensor using ultrasound waves. In addition, the upper side distance sensor 28 may measure movement of the lifter 26, instead of directly measuring the upper side distance b. For example, when a linear actuator is used as the lifter 26, a linear encoder which can measure the displacement amount of the linear actuator may be used. In addition, when the lifter 26 is constituted of a rotation mechanism, an encoder or a potentionmeter measuring a rotation angle may be provided at the root part of the rotation axis, and then the upper side distance b may be estimated from the angle thereof.

The control unit 30 will be described in more detail.

The control unit 30 is a microcomputer including a processor such as a CPU or a GPU. As functional units, the control unit 30 has the wheel driving control unit 38, the lower side distance detection unit 31, the lifter driving control unit 39, and the upper side distance detection unit 32, which are described above. As functional units, the control unit 30 has a cart support control unit 35, a first state detection unit 35g, a second state detection unit 35h, and a final state detection unit 35j, which will be described below. For example, these functional units are realized when a processor such as a CPU executes a program. In addition, a part or all of these functional units may be realized by hardware such as a large scale integration (LSI), an application specific integrated circuit (ASIC), or field-programmable gate array (FPGA) or may be realized by software and hardware in cooperation with each other.

As illustrated in FIG. 3, a storage unit 40 is connected to the control unit 30. The storage unit 40 stores various kinds of data. The control unit 30 performs writing and reading of data with respect to the storage unit 40.

The control unit 30 has the cart support control unit 35. The cart support control unit 35 causes the lifter top plate 20 to be lifted and lowered based on the lower side distance a and to support the weight of the cart 1. The cart support control unit 35 has the first state detection unit 35g, the second state detection unit 35h, and the final state detection unit 35j.

Figure 5:
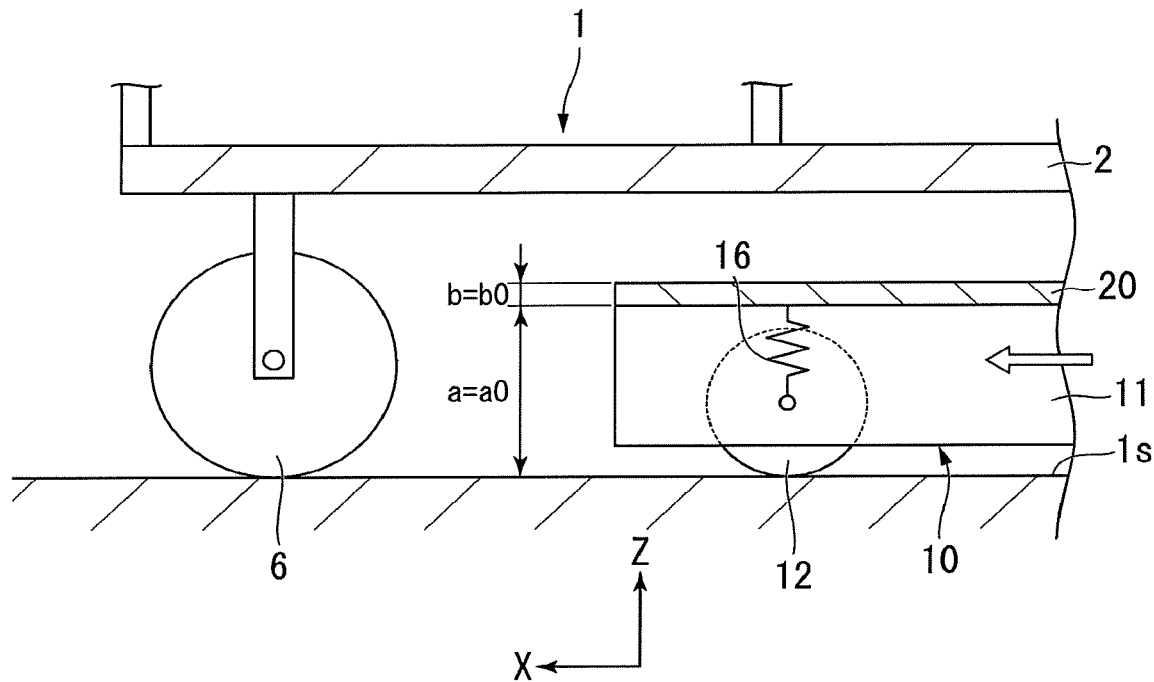
FIG. 5 is a view describing an initial state of a cart supporting operation.

FIG. 5 is a view describing an initial state of a cart supporting operation. The control unit 30 causes, via the wheel driving control unit 38, the wheels 12 to be rotatively driven. Accordingly, the conveying apparatus 10 moves along the floor surface 1s and enters a space between the bottom plate 2 of the cart 1 and the floor surface 1s. In the initial state illustrated in FIG. 5, the lifter top plate 20 is positioned at an end portion in a negative Z-direction. In this state, the lifter top plate 20 does not support the weight of the cart 1. At this time, the lower side distance a has an initial value a0, and the upper side distance b has an initial value b0. The values a0 and b0 are retained in the storage unit 40 in advance.

Figure 6:
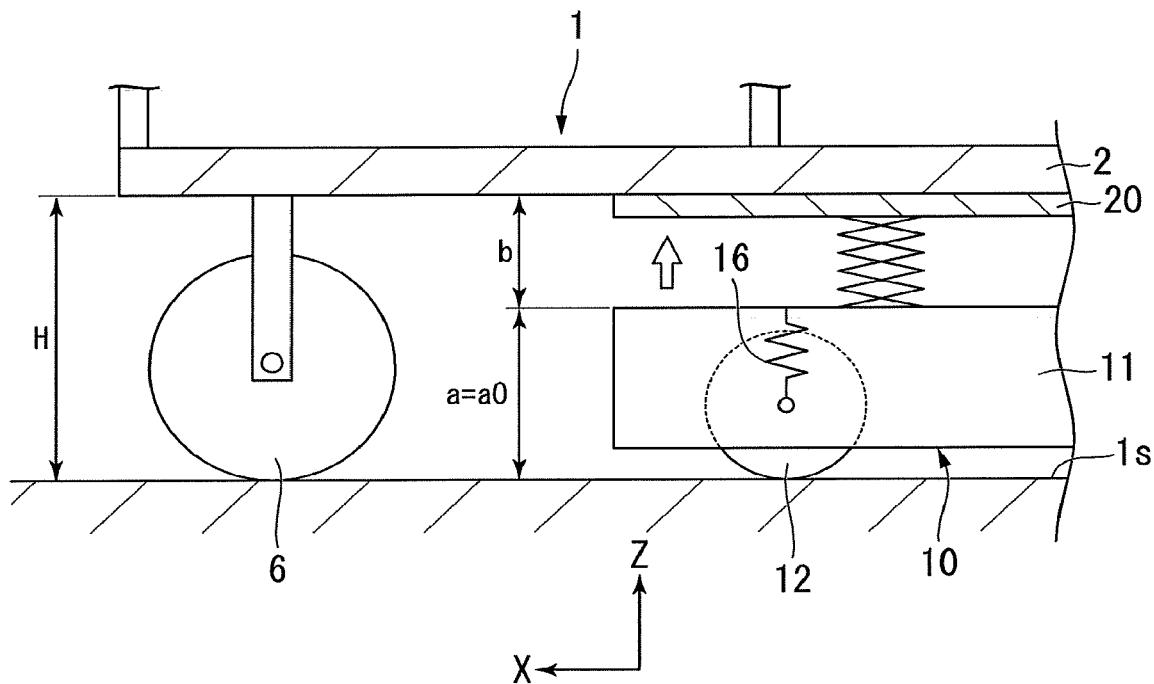
FIG. 6 is a view describing a first state of the cart supporting operation.

FIG. 6 is a view describing a first state of a cart supporting operation. The first state is a state in which the lifter top plate 20 comes into contact with the bottom plate 2 of the cart 1 for the first time.

The cart support control unit 35 causes, via the lifter driving control unit 39, the lifter top plate 20 to be lifted. The lifter top plate 20 comes into contact with the bottom plate 2 of the cart 1 for the first time. In this state, the lifter top plate 20 does not support the weight of the cart 1. That is, the spring member 16 of the suspension mechanism 14 has not shrunk. At this time, the lower side distance a has the initial value a0 without any change. On the other hand, since the lifter top plate 20 is lifted, the upper side distance b has increased. A total distance a+b, which is the sum of the lower side distance a and the upper side distance b, is equal to a height (bottom plate height) H from the floor surface is to the bottom plate 2.

Figure 9:
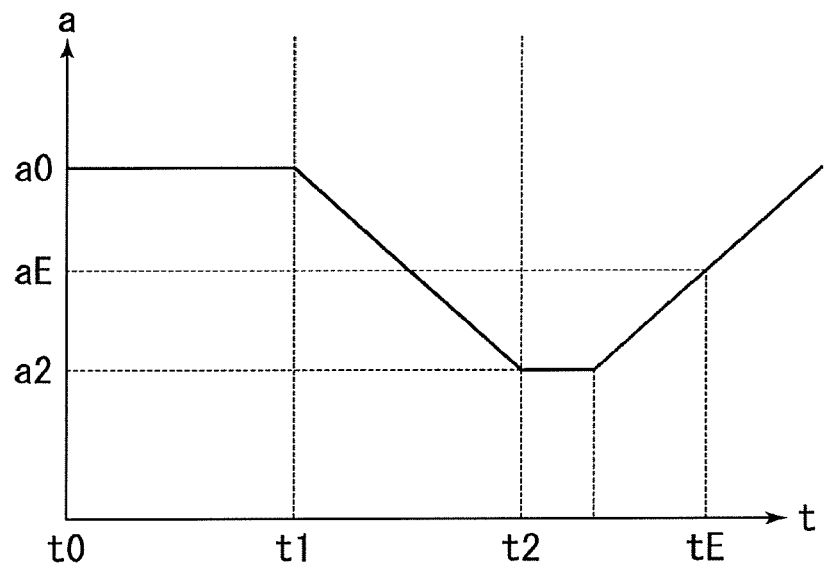
FIG. 9 is a graph illustrating a temporal change in a lower side distance.
Figure 10:
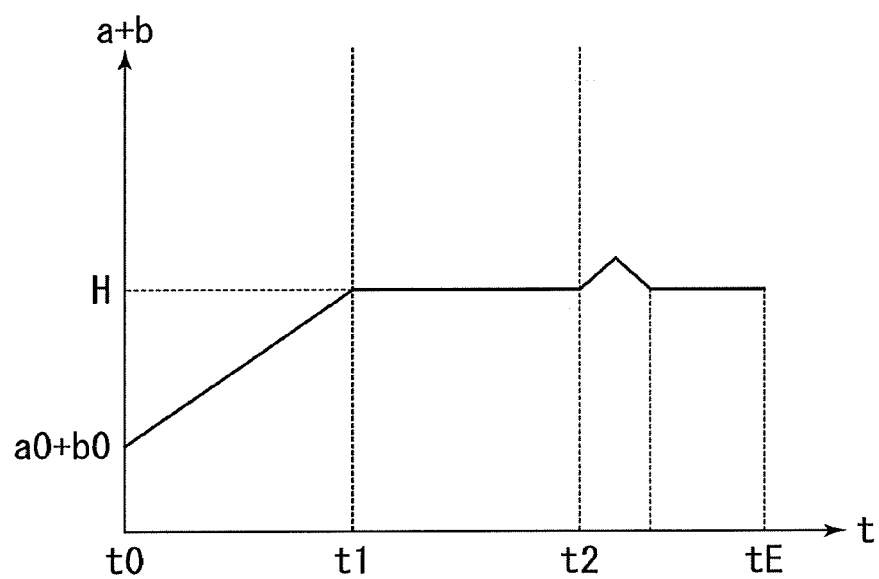
FIG. 10 is a graph illustrating a temporal change in a total distance.

FIG. 9 is a graph illustrating a temporal change in the lower side distance a. FIG. 10 is a graph illustrating a temporal change in the total distance a+b. The initial state illustrated in FIG. 5 is a time t0, and the first state illustrated in FIG. 6 is a time t1.

As illustrated in FIG. 9, the lower side distance a constantly indicates a0 without any change from the initial state t0 to the first state t1. That is, the absolute value of a change amount (temporal rate of change) A of the lower side distance a at a predetermined time is a value close to zero. On the other hand, as illustrated in FIG. 10, the total distance a+b increases from a0+b0 to H from the initial state t0 to the first state t1. That is, the absolute value of a temporal rate AB of change in the total distance a+b is a value greater than zero.

Figure 7:
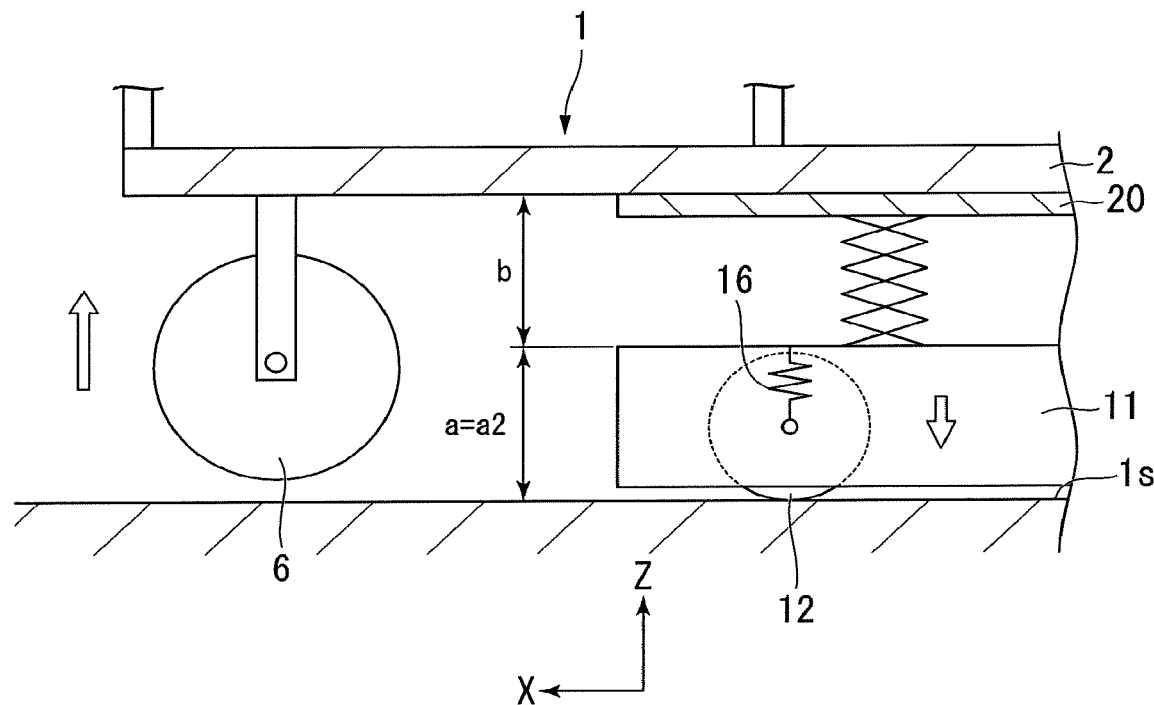
FIG. 7 is a view describing a second state of the cart supporting operation.

FIG. 7 is a view describing a second state of a cart supporting operation. The second state is a state in which the cart 1 has risen above the floor surface 1s for the first time.

The cart support control unit 35 causes the lifter top plate 20 to be further lifted from the first state t1. Accordingly, the spring member 16 shrinks and supports the weight of the cart 1. A weight W of the cart 1 supported by the spring member 16 is expressed as the following Mathematical Expression 1 based on the lower side distance a.

$$W=k(a0-a) \qquad (1)$$

The factor k is a spring constant of the spring member 16. When the spring members 16 are respectively present in the plurality of wheels 12, the factor k is the total value of the spring constants of all of the spring members 16.

When the lifter top plate 20 is further lifted from the first state t1, the spring member 16 shrinks as much as the lifter top plate 20 has been lifted. That is, the lower side distance a is reduced as much as the upper side distance b increases. Therefore, the total distance a+b constantly indicates the bottom plate height H without any change.

When the lifter top plate 20 is further lifted and the spring member 16 supports the entire weight of the cart 1, the casters 6 of the cart 1 rise above the floor surface 1s. When the factor a at this time is a2 and the entire weight of the cart 1 is WC, the following Mathematical Expression 2 is derived from Mathematical Expression 1.

$$WC=k(a0-a2) \qquad (2)$$

In FIG. 9 and FIG. 10, the second state illustrated in FIG. 7 is a section after a time t2. The spring member 16 shrinks from the first state t1 to the second state t2. Therefore, as illustrated in FIG. 9, the lower side distance a is reduced from a0 to a2. That is, the absolute value of the temporal rate A of change in the lower side distance a is a value greater than zero. On the other hand, as illustrated in FIG. 10, the total distance a+b constantly indicates the bottom plate height H without any change from the first state t1 to the second state t2. That is, the absolute value of the temporal rate AB of change in the total distance a+b is a value close to zero.

The first state detection unit 35g detects the first state t1 when the absolute value of the temporal rate A of change in the lower side distance a becomes a first predetermined value TH1 or greater for the first time. The absolute value of the temporal rate A of change in the lower side distance a is equal to the absolute value of a lifting speed VL of the lifter top plate 20 from the first state t1 to the second state t2. Here, the first predetermined value TH1 is set to a value slightly smaller than the absolute value of the lifting speed VL of the lifter top plate 20. The first state detection unit 35g may detect the first state t1 when the absolute value of the temporal rate AB of change in the total distance a+b becomes smaller than a third predetermined value TH3 for the first time. The third predetermined value TH3 is set to a value slightly greater than zero.

When the cart support control unit 35 causes the lifter top plate 20 to be further lifted from the second state t2, since the spring member 16 has already supported the entire weight of the cart 1, the spring member 16 does not shrink from the second state t2. Therefore, as illustrated in FIG. 9, the lower side distance a constantly indicates a2 without any change. That is, the absolute value of the temporal rate A of change in the lower side distance a is a value close to zero.

On the other hand, when the lifter top plate 20 is further lifted from the second state t2, the cart 1 rises higher. Therefore, as illustrated in FIG. 10, the total distance a+b increases beyond the bottom plate height H. That is, the absolute value of the temporal rate AB of change in the total distance a+b is a value greater than zero.

The second state detection unit 35h detects the second state t2 when the absolute value of the temporal rate A of change in the lower side distance a becomes smaller than a second predetermined value TH2 for the first time after the first state detection unit 35g detects the first state t1. The second predetermined value TH2 is set to a value slightly greater than zero. The second state detection unit 35h may detect the second state t2 when the absolute value of the temporal rate AB of change in the total distance a+b becomes a fourth predetermined value TH4 or greater for the first time after the first state detection unit 35g detects the first state t1. The fourth predetermined value TH4 is set to a value slightly smaller than the absolute value of the lifting speed VL of the lifter top plate 20. The second state detection unit 35h causes the storage unit 40 to retain the lower side distance a at the time the second state t2 is detected, as a2.

Figure 8:
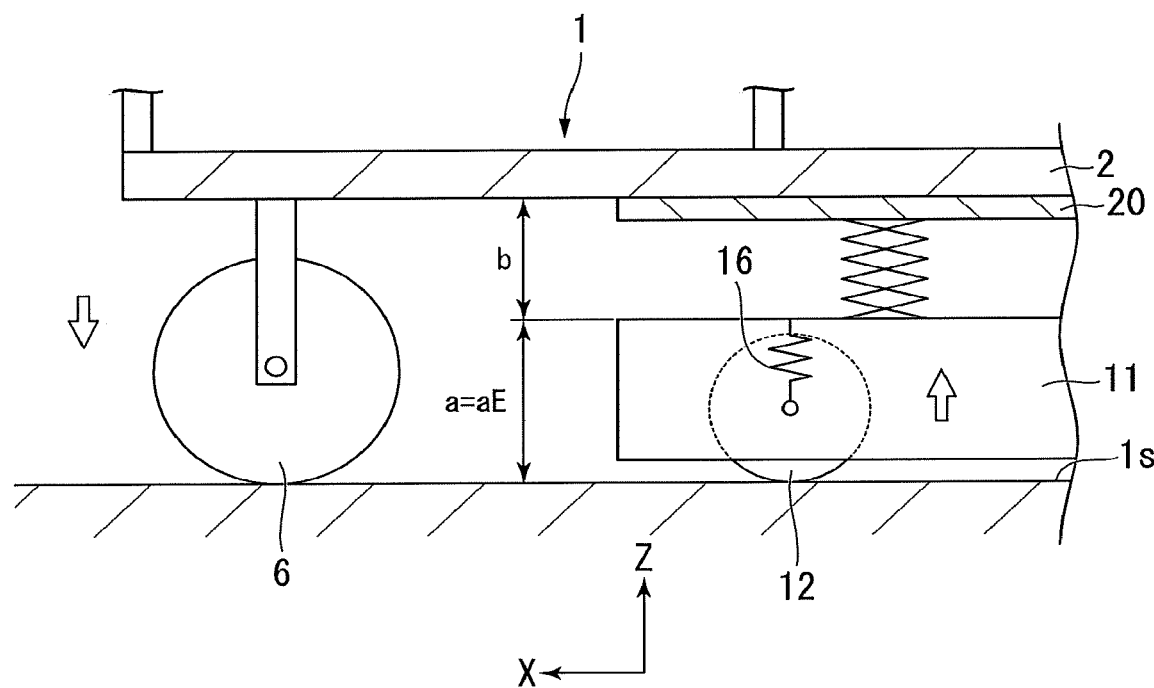
FIG. 8 is a view describing a final state of the cart supporting operation.

FIG. 8 is a view describing a final state of a cart supporting operation. The final state is a state in which the conveying apparatus 10 supports only a part of the weight of the cart 1. In FIG. 9 and FIG. 10, the final state illustrated in FIG. 8 is a time tE.

The cart support control unit 35 causes the lifter top plate 20 to be lowered after the second state detection unit 35h detects the second state t2. Accordingly, the spring member 16 supports only a part of the weight of the cart 1 and is released from supporting the weight of the remaining part. Consequently, the spring member 16 stretches from the second state t2. Therefore, as illustrated in FIG. 9, the lower side distance a increases from a2. On the other hand, when the lifter top plate 20 is lowered, the cart 1 which has risen lands on the floor surface 1s. Consequently, as illustrated in FIG. 10, the total distance a+b is reduced to the bottom plate height H. After the cart 1 lands on the floor surface 1s, the spring member 16 stretches as much as the lifter top plate 20 is lowered. That is, the lower side distance a increases as much as the upper side distance b is reduced. Therefore, the total distance a+b constantly indicates the bottom plate height H without any change.

The spring member 16 supports a predetermined proportion of the weight WC of the cart 1. The final state detection unit 35j detects the final state when the lower side distance a becomes a final predetermined value corresponding to the predetermined proportion of the weight WC of the cart 1.

For example, the final state illustrated in FIG. 8 is a state in which the spring member 16 of the conveying apparatus 10 supports half the weight (WC/2) of the cart 1. When the final predetermined value, which is the lower side distance a in the final state, is aE, the final predetermined value aE is obtained through Mathematical Expression 3 by developing Mathematical Expression 2.

$$WC/2 = k(a0-a2)/2 = k(a0-aE)$$

$$aE = (a0+a2)/2 \quad (3)$$

The final state detection unit 35j reads out a0 and a2 from the storage unit 40 and calculates the final predetermined value aE. The final state detection unit 35j detects the final state when the lower side distance a detected by the lower side distance detection unit 31 becomes, for example, the final predetermined value aE expressed by Mathematical Expression 3. The final state detection unit 35j may detect the final state when the lower side distance a becomes smaller than the final predetermined value aE, or when the lower side distance a approximates to the final predetermined value aE. The cart support control unit 35 causes the lifter top plate 20 to stop being lowered after the final state detection unit 35j detects the final state. Accordingly, the conveying apparatus 10 supports half the weight of the cart 1.

The above description is based on the premise that the bottom plate 2 of the cart 1 is a rigid body. In this case, the bottom plate 2 is not warped in the Z-direction, even if the bottom plate 2 is pushed up by the lifter top plate 20. In contrast, when the bottom plate 2 is formed of resin or a metal thin plate, the bottom plate 2 is warped in the Z-direction. In this case, in consideration of warp of the bottom plate 2, values such as various predetermined values TH1 to TH4 and the bottom plate height H are set.

A conveying method using the conveying apparatus 10 of the first embodiment will be described.

Figure 4:
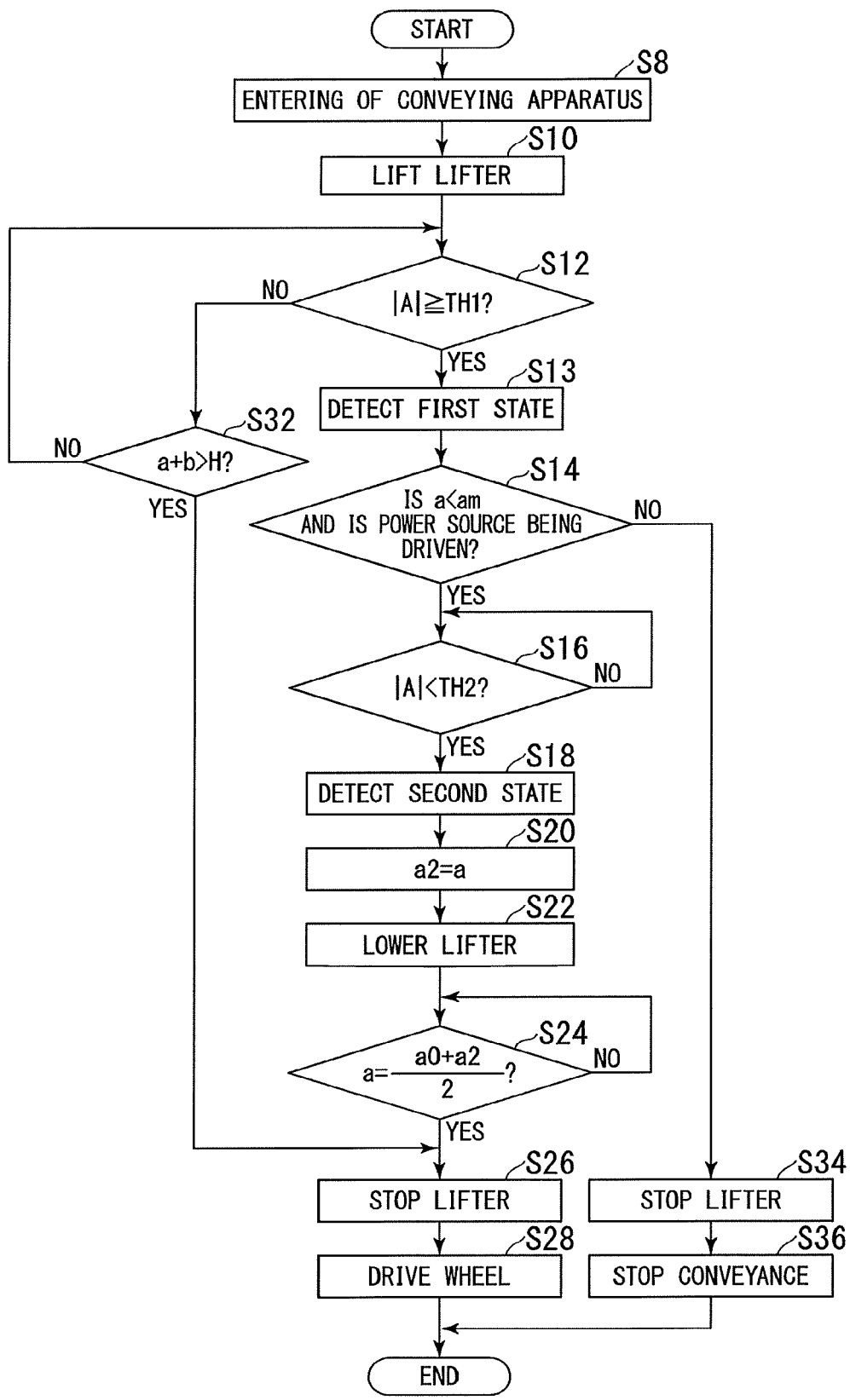
FIG. 4 is a flow chart of a conveying method.

FIG. 4 is a flow chart of the conveying method.

The conveying apparatus 10 detects the cart 1 by using a camera, a sensor, or the like. The control unit 30 causes, via the wheel driving control unit 38, the wheels 12 to be rotatively driven. Accordingly, the conveying apparatus 10 moves along the floor surface 1s. As illustrated in FIG. 5 as the initial state, the conveying apparatus 10 enters a space between the bottom plate 2 of the cart 1 and the floor surface 1s (S8).

The cart support control unit 35 causes, via the lifter driving control unit 39, the lifter top plate 20 to be lifted (S10). Accordingly, as illustrated in FIG. 6 as the first state, the lifter top plate 20 comes into contact with the bottom plate 2 of the cart 1 for the first time.

The first state detection unit 35g determines whether or not the absolute value of the temporal rate A of change in the lower side distance a is the first predetermined value TH1 or greater (S12). In S12, the first state detection unit 35g may determine whether or not the absolute value of the temporal rate AB of change in the total distance a+b is smaller than the third predetermined value TH3. When the determination in S12 is YES, the first state detection unit 35g detects the first state t1 in which the lifter top plate 20 comes into contact with the bottom plate 2 of the cart 1 for the first time (S13).

A case in which the determination in S12 is NO will be described below. When the determination in S12 is YES, the process proceeds to S16 through the determination in S14. The determination in S14 will be described below.

The cart support control unit 35 causes the lifter top plate 20 to be further lifted. Accordingly, as illustrated in FIG. 7 as the second state, the cart 1 rises above the floor surface 1s for the first time.

After the first state detection unit 35g detects the first state t1 in S13, the second state detection unit 35h determines whether or not the absolute value of the temporal rate A of change in the lower side distance a is smaller than the second predetermined value TH2 (S16). In S16, the second state detection unit 35h may determine whether or not the absolute value of the temporal rate AB of change in the total distance a+b is the fourth predetermined value TH4 or greater. When the determination in S16 is YES, the second state detection unit 35h detects the second state t2 in which the cart 1 rises above the floor surface is for the first time (S18). The second state detection unit 35h causes the storage unit 40 to retain the lower side distance a at the time the second state t2 is detected, as a2 (S20).

The cart support control unit 35 causes, via the lifter driving control unit 39, the lifter top plate 20 to be lowered (S22). Accordingly, as illustrated in FIG. 8 as the final state, the conveying apparatus 10 supports only a part of the weight of the cart 1.

The final state detection unit 35j determines whether or not the lower side distance a detected by the lower side distance detection unit 31 satisfies the following Mathematical Expression 4 (S24).

$$a = aE = (a0 + a2)/2 \quad (4)$$

The final state detection unit 35j reads out a0 and a2 from the storage unit 40 and calculates the final predetermined value aE. When the determination in S24 is YES, the final state detection unit 35j detects a final state tE in which the spring member 16 of the conveying apparatus 10 supports half the weight of the cart 1. The cart support control unit 35 causes, via the lifter driving control unit 39, the lifter top plate 20 to stop being lowered (S26).

The control unit 30 causes, via the wheel driving control unit 38, the wheels 12 to be rotatively driven (S28). Accordingly, the conveying apparatus 10 conveys the cart 1 in the horizontal direction in a state in which half the weight of the cart 1 is supported. Since the conveying apparatus 10 supports a part of the weight of the cart 1, a downward load is applied to the wheels 12 of the conveying apparatus 10. Therefore, even when the weight of the cart 1 is large, the wheels 12 of the conveying apparatus 10 do not spin with no traction. In addition, since the conveying apparatus 10 conveys the cart 1 in a state of being in contact with the ground, the cart 1 is held in a stable state even when the weight of the cart 1 is large. Therefore, the conveying apparatus 10 can convey the cart 1 in a stable state.

Hereby, the process of the conveying method ends.

A case in which the determination in S12 is NO will be described.

In S12, the first state detection unit 35g determines whether or not the absolute value of the temporal rate A of change in the lower side distance a is the first predetermined value TH1 or greater. As illustrated in FIG. 9, the determination in S12 becomes NO in a section from the initial state t0 to the first state t1. When the first state t1 has elapsed, the determination in S12 becomes YES.

Figure 11:
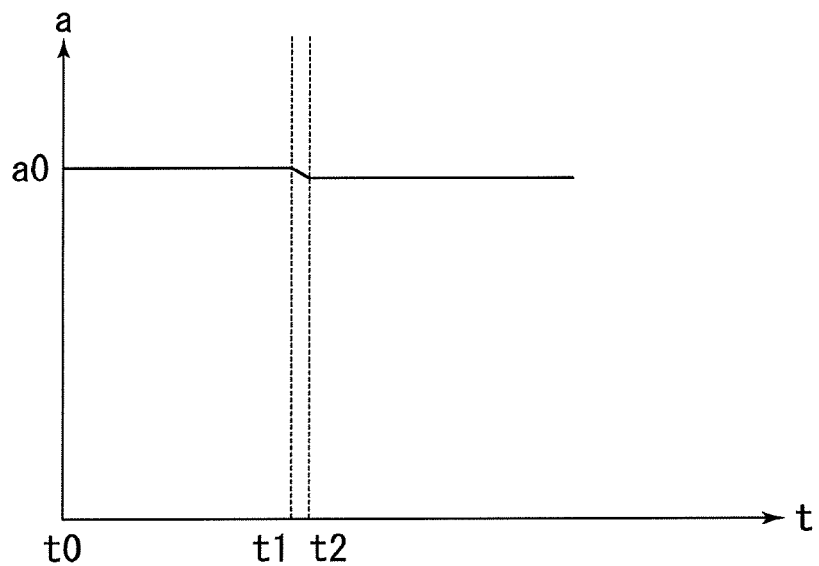
FIG. 11 is a graph illustrating a temporal change in the lower side distance when the weight of the cart is small.
Figure 12:
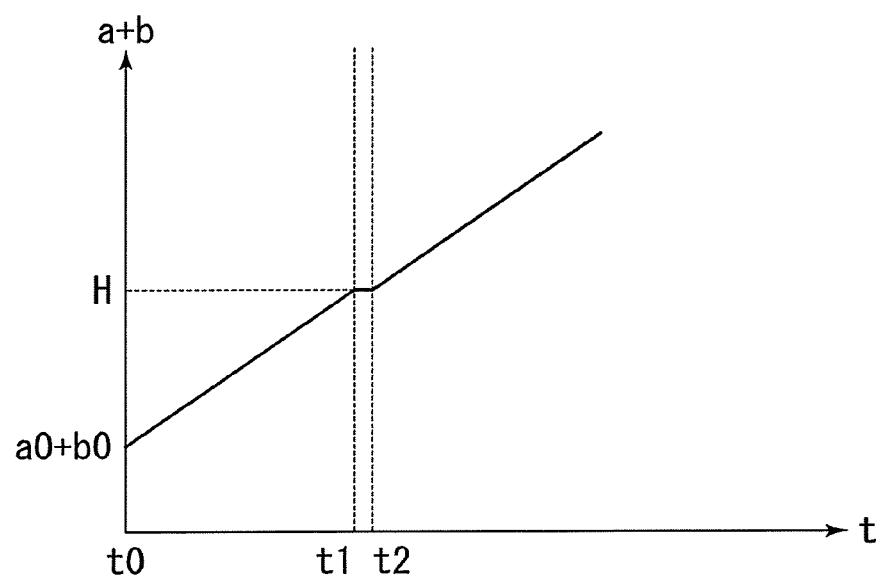
FIG. 12 is a graph illustrating a temporal change in the total distance when the weight of the cart is small.

FIG. 11 is a graph illustrating a temporal change in the lower side distance a when the weight of the cart 1 is small. FIG. 12 is a graph illustrating a temporal change in the total distance a+b when the weight of the cart 1 is small.

There are cases in which the weight of the cart 1 may be extremely smaller than the allowable load of the lifter top plate 20, such as a case in which the cart 1 is not loaded with cargo. In this case, as illustrated in FIG. 11 and FIG. 12, the second state (state in which the cart 1 rises above the floor surface 1s for the first time) t2 is generated immediately after the first state t1. When the second state t2 has elapsed, the absolute value of the temporal rate A of change in the lower side distance a becomes a value close to zero. Therefore, there is a possibility that the first state detection unit 35g will erroneously make the determination in S12. That is, even if the first state t1 has elapsed, there is a possibility that the determination in S12 will become NO. At this time, the first state detection unit 35g cannot detect the first state t1.

When the determination in S12 is NO, the first state detection unit 35g determines whether or not the following Mathematical Expression 5 is established (S32).

$$a + b > H \quad (5)$$

The bottom plate height H is retained in the storage unit 40 in advance as a known value. In S32, it is determined whether or not the total distance a+b exceeds the bottom plate height H. As illustrated in FIG. 10 and FIG. 12, the total distance a+b exceeds the bottom plate height H after the second state t2 elapses. The determination in S32 becomes NO in a section from the initial state t0 to the first state t1. In this case, the cart support control unit 35 causes the lifter top plate 20 to be continuously lifted until the determination in S12 becomes YES (until the first state t1 elapses).

When the weight of the cart 1 is small, there is a possibility that the determination in S12 will become NO, even if the first state t1 has elapsed. However, as illustrated in FIG. 11 and FIG. 12, when the weight of the cart 1 is small, the second state t2 is generated immediately after the first state t1. Therefore, when the weight of the cart 1 is small, the determination in S32 becomes YES immediately after the first state t1.

Here, the cart support control unit 35 causes the lifter top plate 20 to stop being lifted (S26). Since the first state t1 has elapsed, the lifter top plate 20 is in contact with the bottom plate 2 of the cart 1. If the second state t2 has elapsed, the cart 1 rises above the floor surface 1s. The control unit 30 causes the wheels to be rotatively driven and to convey the cart 1 (S28). Since the lifter top plate 20 is in contact with the bottom plate 2 of the cart 1, the conveying apparatus 10 can convey the cart 1. In addition, since the weight of the cart 1 is small, the cart 1 does not become unstable, even if the cart 1 rises above the floor surface 1s. Therefore, the conveying apparatus 10 can convey the cart 1 in a stable state.

In S26, the lifter top plate 20 may be lowered after the lifter top plate 20 stops being lifted. Accordingly, the conveying apparatus 10 conveys the cart 1 in a state in which only a part of the weight of the cart 1 is supported.

The conveying apparatus 10 of the first embodiment handles the bottom plate height H as a known value. Alternatively, the conveying apparatus 10 may capture an image of the cart 1 by using a camera and may detect the bottom plate height H through image analysis.

The determination in S14 will be described.

Figure 13:
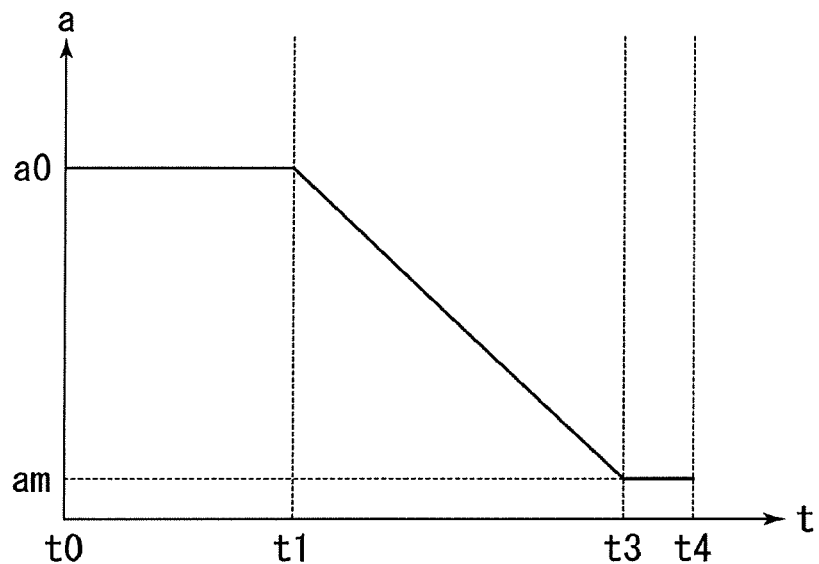
FIG. 13 is a graph illustrating a temporal change in the lower side distance when the weight of the cart is large.
Figure 14:
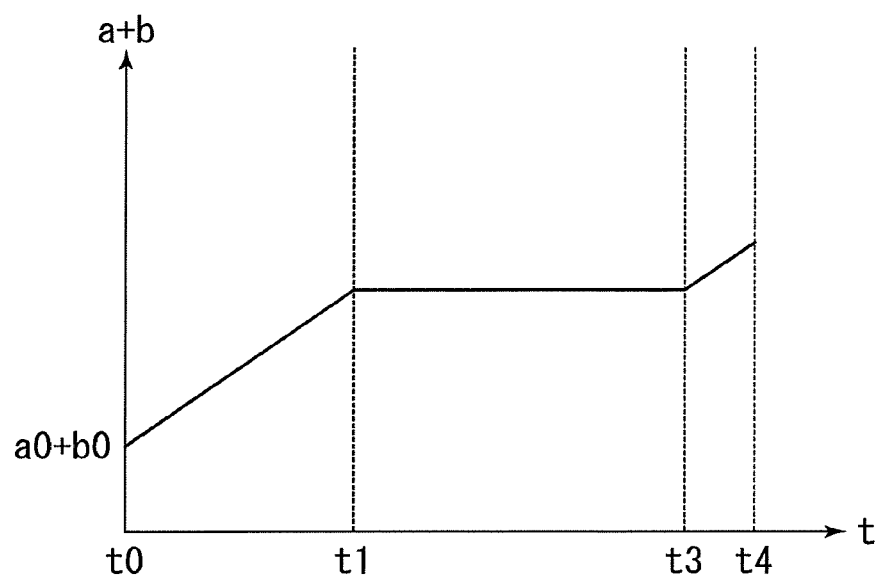
FIG. 14 is a graph illustrating a temporal change in the total distance when the weight of the cart is large.

FIG. 13 is a graph illustrating a temporal change in the lower side distance a when the weight of the cart 1 is large. FIG. 14 is a graph illustrating a temporal change in the total distance a+b when the weight of the cart 1 is large.

As illustrated in FIG. 13, the spring member 16 shrinks after the first state t1 elapses, and the spring member 16 supports the weight of the cart 1. However, in cases in which the weight of the cart 1 is large, such as a case in which the cart 1 is loaded with heavy cargo, the spring member 16 cannot support the entire weight of the cart 1, even if the spring member 16 shrinks to a compression limit. A state in which the spring member 16 has shrunk to the compression limit is called a bottomed state, and the lower side distance a in the bottomed state is am. After the bottomed state is generated at a time t3, the lower side distance a constantly indicates am without any change, even if the lifter top plate 20 is continuously lifted.

Even after the bottomed state t3 is generated, there is a possibility that the power source of the lifter top plate 20 will be able to support the weight of the cart 1. In this case, when the lifter top plate 20 is continuously lifted, the total distance a+b increases after the bottomed state t3 is generated, as illustrated in FIG. 14. However, when the weight of the cart 1 supported by the power source of the lifter top plate 20 exceeds the allowable load of the lifter top plate 20, the power source of the lifter top plate 20 stops. A state of exceeding the allowable load of the lifter top plate 20 is called an allowance excess state. After the allowance excess state is generated at a time t4, the lifter top plate 20 stops being lifted.

In example in the FIG. 13 and FIG. 14, the bottomed state t3 is generated first, and the allowance excess state t4 is generated thereafter. In contrast, there are cases in which the allowance excess state is generated first, and the bottomed state is generated thereafter.

In S14, the cart support control unit 35 determines whether or not the lower side distance a is smaller than am (Condition 1) and the power source of the lifter top plate 20 is being driven (Condition 2). The cart support control unit 35 determines the driving state of the power source by using a sensor or the like. When the lower side distance a is smaller than am and satisfies Condition 1, the bottomed state is not generated. When the power source of the lifter top plate 20 is being driven and satisfies Condition 2, the allowance excess state is not generated. When the weight of the cart 1 is standard, none of the bottomed state and the allowance excess state is generated. Therefore, the determination in S14 becomes YES. In this case, the process proceeds to S16 and S18, and the second state t2 is detected.

In contrast, when the weight of the cart 1 is large and the bottomed state or the allowance excess state is generated, the determination in S14 becomes NO. In this case, the cart support control unit 35 causes the lifter top plate 20 to stop being lifted (S34). When the bottomed state is generated, the suspension mechanism 14 does not function. When the allowance excess state is generated, there is concern over a malfunction of the conveying apparatus 10. Here, the control unit 30 stops a conveying process of the cart 1 (S36).

Even if at least one of the bottomed state and the allowance excess state is generated, the spring member 16 of the conveying apparatus 10 supports a part of the weight of the cart 1. Here, the control unit 30 may cause the cart 1 to be conveyed in a state in which at least one of the bottomed state and the allowance excess state is generated.

As described above in detail, the conveying apparatus 10 of the first embodiment has the base 11, the wheels 12, the lifter top plate 20, the lower side distance detection unit 31, and the control unit 30. The wheels 12 are connected to the base 11 via the suspension mechanisms 14 and are rotatable. The lifter top plate 20 is able to be lifted and lowered with respect to the base 11 in the direction of the cart 1. The lower side distance detection unit 31 detects the lower side distance a between the reference surface 11s of the base 11 and the floor surface is which is a ground contact surface of the wheels 12. The control unit 30 controls a lifting/lowering operation of the lifter top plate 20 and rotative driving of the wheels 12. The control unit 30 causes the lifter top plate 20 to be lifted and lowered based on the lower side distance a and to support a part of the weight of the cart 1, and causes the wheels 12 to be rotatively driven and to convey the cart 1.

Since the conveying apparatus 10 supports a part of the weight of the cart 1, a downward load is applied to the wheels 12 of the conveying apparatus 10. Therefore, even when the weight of the cart 1 is large, the wheels 12 of the conveying apparatus 10 do not spin with no traction. In addition, since the conveying apparatus 10 conveys the cart 1 in a state of being in contact with the ground, the cart 1 is held in a stable state even when the weight of the cart 1 is large. Therefore, the conveying apparatus 10 can convey the cart 1 in a stable state. The conveying apparatus 10 can minimize collapse of cargo loaded in the cart 1.

The state of supporting the weight of the cart 1 by the conveying apparatus 10, the state of the suspension mechanism 14, and the lower side distance a from the reference surface 11s of the base 11 to the floor surface is are related to each other. The control unit 30 causes the lifter top plate 20 to be lifted and lowered based on the lower side distance a and to support a part of the weight of the cart 1. Accordingly, a special apparatus for detecting the state of supporting the weight of the cart 1 or rising of the cart 1 is not required. Therefore, the conveying apparatus 10 which is capable of conveying the cart 1 in a stable state is provided at low cost.

After the lifter top plate 20 is lifted and the first state t1, in which the upper surface of the lifter top plate 20 comes into contact with the bottom plate 2 of the cart 1, is detected, the control unit 30 detects the second state t2 in which the cart 1 rises above the floor surface 1s.

Since the control unit 30 detects the second state after the first state is detected, the second state can be accurately detected.

The control unit 30 detects the first state t1 when the absolute value of the temporal rate of change in the lower side distance a becomes the first predetermined value TH1 or greater.

The control unit 30 detects the second state t2 when the absolute value of the temporal rate of change in the lower side distance a becomes smaller than the second predetermined value TH2.

Accordingly, the control unit 30 can detect rising of the cart 1 based on only the lower side distance a. Therefore, there is no need to detect a physical amount other than the lower side distance a. Therefore, the conveying apparatus 10 is provided at low cost.

The conveying apparatus 10 has the upper side distance detection unit 32 detecting the upper side distance b between the reference surface 11s of the base 11 and the upper surface 20s of the lifter top plate 20.

The control unit 30 may detect the first state t1 when the absolute value of the temporal rate of change in the total distance a+b which is the sum of the lower side distance a and the upper side distance b becomes smaller than the third predetermined value TH3.

The control unit 30 may detect the second state t2 when the absolute value of the temporal rate of change in the total distance a+b which is the sum of the lower side distance a and the upper side distance b becomes the fourth predetermined value TH4 or greater.

In this case as well, the control unit 30 can detect rising of the cart 1.

The control unit 30 causes the lifter top plate 20 to be lifted and detects the second state t2. Thereafter, the control unit 30 causes the lifter top plate 20 to be lowered to further increase the lower side distance a than the lower side distance a at the time the second state t2 is detected. Accordingly, the control unit 30 supports a part of the weight of the cart 1.

At the time the control unit 30 detects the second state t2, the conveying apparatus 10 supports the entire weight of the cart 1. The control unit 30 causes the lower side distance a to be increased based on a relationship with respect to the lower side distance a (=a2) at the time the second state t2 is detected. Accordingly, the control unit 30 can support a predetermined proportion of the entire weight of the cart 1.

The base 11 has the PSD sensor 18. The lower side distance detection unit 31 detects the lower side distance a based on an output signal of the PSD sensor 18.

The PSD sensor 18 does not detect the intensity of incident light but detects the position of incident light. Therefore, the PSD sensor 18 outputs an accurate signal regardless of the material or the color of a target. Therefore, the lower side distance detection unit 31 can accurately detect the lower side distance a regardless of the surface state or the color of the floor surface 1s.

Second Embodiment

Figure 15:
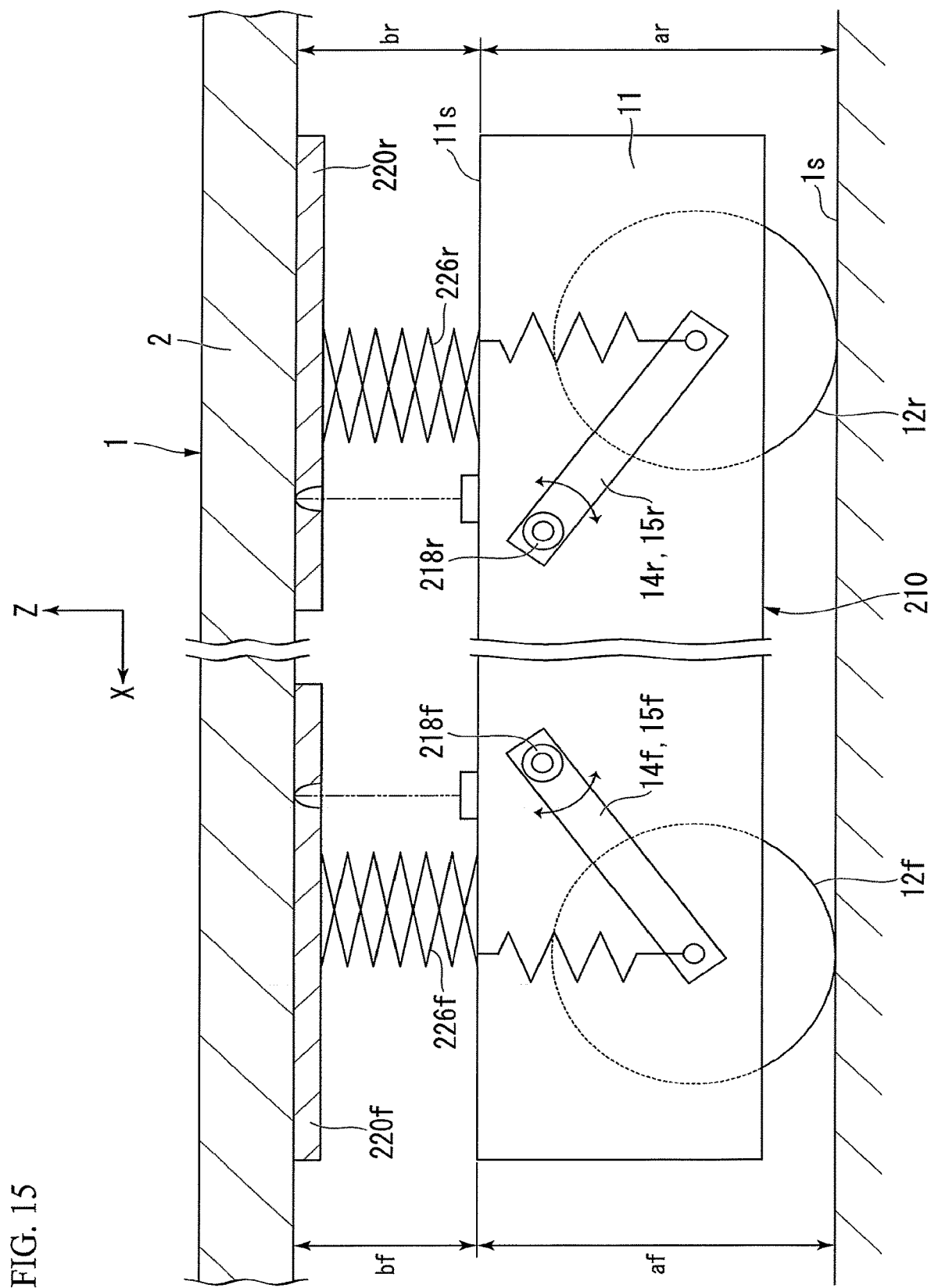
FIG. 15 is a cross-sectional view illustrating an internal configuration of a conveying apparatus of a second embodiment.

With reference to FIG. 15, a conveying apparatus 210 of a second embodiment will be described. The conveying apparatus 210 of the second embodiment differs from the conveying apparatus of the first embodiment in having rotation angle sensors 218f and 218r and having a plurality of lifter top plates 220f and 220r. In the configurations of the second embodiment, configurations other than the configurations described below are similar to the configurations of the first embodiment.

FIG. 15 is a cross-sectional view illustrating an internal configuration of the conveying apparatus 210 of the second embodiment.

The conveying apparatus 210 has first wheels 12f and second wheels 12r.

For example, the first wheels 12f are disposed in the positive X-direction (forward in the conveying direction) of the conveying apparatus 210. For example, the second wheels 12r are disposed in the negative X-direction (rearward in the conveying direction) of the conveying apparatus 210.

The conveying apparatus 210 has the first lifter top plate 220f and the second lifter top plate 220r.

The first lifter top plate 220f is disposed in the positive Z-direction (upward) of the first wheels 12f. The second lifter top plate 220r is disposed in the positive Z-direction (upward) of the second wheels 12r. The lifter top plates 220f and 220r have individual lifters 226f and 226r, and individual power sources (not illustrated), respectively. The lifter driving control unit 39 individually controls a lifting/lowering operation of each of the lifter top plates 220f and 220r by driving each of the power sources. In this application, there are cases in which the first lifter top plate 220f and the lifter 226f are generically named as a first lifter. In this application, there are cases in which the second lifter top plate 220r and the lifter 226r are generically named as a second lifter.

The conveying apparatus 210 has the first rotation angle sensor 218f and the second rotation angle sensor 218r.

The first rotation angle sensor 218f is mounted at the first end portion of an arm 15f on the base 11 side in a suspension mechanism 14f of the first wheels 12f. The first rotation angle sensor 218f is an encoder, a potentionmeter, or the like. The first rotation angle sensor 218f outputs a signal related to the rotation angle of the arm 15f to the lower side distance detection unit 31. The lower side distance detection unit 31 detects a first lower side distance af based on an output signal of the first rotation angle sensor 218f. The first lower side distance af is a distance between the reference surface 11s of the base 11 in the negative Z-direction of the first lifter top plate 220f, and the floor surface 1s which is a ground contact surface of the first wheels 12f.

The second rotation angle sensor 218r is similar to the first rotation angle sensor 218f. The second rotation angle sensor 218r outputs a signal related to the rotation angle of an arm 15r to the lower side distance detection unit 31. The lower side distance detection unit 31 detects a second lower side distance ar based on an output signal of the second rotation angle sensor 218r. The second lower side distance ar is a distance between the reference surface 11s of the base 11 in the negative Z-direction of the second lifter top plate 220r, and the floor surface 1s which is a ground contact surface of the second wheels 12r.

The cart support control unit 35 causes the first lifter top plate 220f to be lifted and lowered based on the first lower side distance of and causes the second lifter top plate 220r to be lifted and lowered based on the second lower side distance ar.

For example, a case in which the weight of the cart 1 in the positive X-direction is greater than the weight thereof in the negative X-direction will be examined. The cart support control unit 35 causes the first lifter top plate 220f and the second lifter top plate 220r to be lifted. The second state detection unit 35h detects the second state (state in which the cart 1 rises above the floor surface is for the first time) with respect to each of the positive X-direction and the negative X-direction of the cart 1. A first lower side distance af2 at the time the second state is detected with respect to the positive X-direction of the cart 1 becomes smaller than a second lower side distance ar2 at the time the second state is detected with respect to the negative X-direction.

The cart support control unit 35 causes the first lifter top plate 220f and the second lifter top plate 220r to be lowered. Accordingly, the conveying apparatus 210 supports only a part of the weight of the cart 1 in the final state of a cart supporting operation. For example, the conveying apparatus 210 supports half the weight of the cart 1 in the positive X-direction and the negative X-direction. The first lower side distance af in the initial state is af0, and the first lower side distance af in the final state is afE. The factor afE is obtained through the following Mathematical Expression 6 based on Mathematical Expression 3.

$$afE=(af0+af2)/2 \quad (6)$$

Similarly, the second lower side distance ar in the initial state is ar0, and the second lower side distance ar in the final state is arE. The factor arE is obtained through the following Mathematical Expression 7 based on Mathematical Expression 3.

$$arE=(ar0+ar2)/2 \quad (7)$$

The final state detection unit 35j detects the final state when the first lower side distance af detected by the lower side distance detection unit 31 becomes afE as expressed by Mathematical Expression 6. The cart support control unit 35 stops the first lifter top plate 220f being lowered after the final state detection unit 35j detects the final state. Accordingly, the conveying apparatus 10 supports half the weight of the cart 1 in the positive X-direction.

The final state detection unit 35j detects the final state when the second lower side distance ar detected by the lower side distance detection unit 31 becomes arE as expressed by Mathematical Expression 7. The cart support control unit 35 stops the second lifter top plate 220r being lowered after the final state detection unit 35j detects the final state. Accordingly, the conveying apparatus 10 supports half the weight of the cart 1 in the negative X-direction.

As described above in detail, in the conveying apparatus 210 of the second embodiment, the suspension mechanisms 14f and 14r have the arms 15f and 15r, and the rotation angle sensors 218f and 218r, respectively. The arms 15f and 15r respectively connect the wheels 12f and 12r to the base in a vertically movable manner. The rotation angle sensors 218f and 218r detect the rotation angles of the arms 15f and 15r with respect to the base 11. The lower side distance detection unit 31 detects the lower side distances af and ar based on an output signal of the rotation angle sensors 218f and 218r.

Accordingly, the lower side distance detection unit 31 can accurately and inexpensively detect the lower side distances af and ar.

The wheel has the first wheels 12f and the second wheels 12r. The lifter top plate has the first lifter top plate 220f and the second lifter top plate 220r. The first lifter top plate 220f is disposed above the first wheels 12f. The second lifter top plate 220r is disposed above the second wheels 12r. The lower side distance detection unit 31 detects the first lower side distance af between the reference surface 11s of the base 11 below the first lifter top plate 220f and the floor surface is which is a ground contact surface of the first wheels 12f. The lower side distance detection unit 31 detects the second lower side distance ar between the reference surface 11s of the base 11 below the second lifter top plate 220r and the floor surface is which is a ground contact surface of the second wheels 12r. The control unit 30 causes the first lifter top plate 220f to be lifted and lowered based on the first lower side distance af. The control unit 30 causes the second lifter top plate 220r to be lifted and lowered based on the second lower side distance ar.

Accordingly, the conveying apparatus 210 can cause a supporting force to act on the cart 1 in accordance with distribution of the weight of the cart 1. Therefore, the conveying apparatus 210 can convey the cart 1 in a stable state. The conveying apparatus 210 can also estimate the position of the center of gravity in the cart 1 based on the distribution of the weight of the cart 1.

The cart 1 illustrated in FIG. 1 has four casters 6. In contrast, the cart 1 may have six casters. In this case, two casters in the front, two casters in the middle, and two casters in the rear are disposed in the conveying direction. The two casters in the middle are in contact with the ground at all times. When the cart 1 is tilted forward and is conveyed, the two casters in the front are come into contact with the ground, and the two casters in the rear rise. When the cart 1 is tilted rearward and is conveyed, the two casters in the rear come into contact with the ground, and the two casters in the front rise. The conveying apparatus 10 enters a middle part of the four casters in contact with the ground, lifts the lifter top plate 20 and supports a part of the weight of the cart 1.

According to at least one of the embodiments described above, the cart 1 can be conveyed in a stable state by including the control unit 30 that causes the lifter top plate 20 to be lifted and lowered based on the lower side distance a and to support a part of the weight of the cart 1.

The embodiments can be expressed as follows.

(1) A conveying apparatus comprising: a base; a wheel that is connected to the base via a suspension mechanism and is rotatable; a lifter that is able to be lifted and lowered with respect to the base in a direction of a conveyance target; a lower side distance detection unit that detects a lower side distance between a reference surface of the base and a ground contact surface of the wheel; and a control unit that controls a lifting/lowering operation of the lifter and rotative driving of the wheel, wherein the control unit has a conveyance target support control unit which causes the lifter to be lifted and lowered based on the lower side distance and to support a part of the weight of the conveyance target, and wherein the control unit causes, via the conveyance target support control unit, a part of the weight of the conveyance target to be supported, and causes the wheel to be rotatively driven and to convey the conveyance target.

(2) A conveying apparatus comprising: a base; a wheel that is connected to the base via a suspension mechanism and is rotatable; a lifter that is able to be lifted and lowered with respect to the base in a direction of a conveyance target; a lower side distance detection unit that detects a lower side distance between a reference surface of the base and a ground contact surface of the wheel; and a control unit that controls a lifting/lowering operation of the lifter and rotative driving of the wheel, wherein the control unit has a conveyance target support control unit which causes the lifter to be lifted and lowered based on the lower side distance and to support a part of the weight of the conveyance target, wherein the conveyance target support control unit has a first state detection unit which detects a first state in which the lifter comes into contact with the conveyance target when the absolute value of a temporal rate of change in the lower side distance becomes a first predetermined value or greater, a second state detection unit which detects a second state in which the conveyance target rises above the ground contact surface of the wheel when the absolute value of the temporal rate of change in the lower side distance becomes smaller than a second predetermined value, and a final state detection unit which detects a final state when the lower side distance becomes a final predetermined value corresponding to a predetermined proportion of the weight of the conveyance target, wherein after the lifter is lifted and the first state is detected by the first state detection unit, the conveyance target support control unit detects the second state via the second state detection unit, wherein after the second state is detected by the second state detection unit, the conveyance target support control unit causes the lifter to be lowered to further increase the lower side distance than the lower side distance at the time the second state is detected, and detects the final state via the final state detection unit, and wherein the control unit causes the wheel to be rotatively driven and to convey the conveyance target.

(3) A conveying apparatus comprising: a base; a first wheel and a second wheel that are connected to the base via suspension mechanisms and are rotatable; a first lifter that is able to be lifted and lowered with respect to the base in a direction of a conveyance target and is disposed above the first wheel; a second lifter that is able to be lifted and lowered with respect to the base in the direction of the conveyance target and is disposed above the second wheel; a lower side distance detection unit that detects a first lower side distance between a reference surface of the base below the first lifter and a ground contact surface of the first wheel, and a second lower side distance between the reference surface of the base below the second lifter and a ground contact surface of the second wheel; and a control unit that controls lifting/lowering operations of the first lifter and the second lifter and rotative driving of the first wheel and the second wheel, wherein the control unit has a conveyance target support control unit which causes the first lifter to be lifted and lowered based on the first lower side distance and causes the second lifter to be lifted and lowered based on the second lower side distance to support a part of the weight of the conveyance target, and wherein the control unit causes, via the conveyance target support control unit, a part of the weight of the conveyance target to be supported, and causes the wheel to be rotatively driven and to convey the conveyance target.

(4) A method of controlling a conveying apparatus including a base, a wheel that is connected to the base via a suspension mechanism and is rotatable, a lifter that is able to be lifted and lowered with respect to the base in a direction of a conveyance target, a lower side distance detection unit that detects a lower side distance between a reference surface of the base and a ground contact surface of the wheel, and a control unit that controls a lifting/lowering operation of the lifter and rotative driving of the wheel, the method comprising:

causing, by the control unit, the lifter to be lifted and lowered based on the lower side distance and to support a part of the weight of the conveyance target; and causing the wheel to be rotatively driven and to convey the conveyance target.

(5) A method of controlling a conveying apparatus including a base, a wheel that is connected to the base via a suspension mechanism and is rotatable, a lifter that is able to be lifted and lowered with respect to the base in a direction of a conveyance target, a lower side distance detection unit that detects a lower side distance between a reference surface of the base and a ground contact surface of the wheel, and a control unit that controls a lifting/lowering operation of the lifter and rotative driving of the wheel, the method comprising:

causing, by the control unit, the lifter to be lifted; detecting a first state in which the lifter comes into contact with the conveyance target when the absolute value of a temporal rate of change in the lower side distance becomes a first predetermined value or greater; then detecting a second state in which the conveyance target rises above the ground contact surface of the wheel when the absolute value of the temporal rate of change in the lower side distance becomes smaller than a second predetermined value;

causing, by the control unit after the second state is detected, the lifter to be lowered to further increase the lower side distance than the lower side distance at the time the second state is detected, and to support a part of the weight of the conveyance target; and causing, by the control unit, the wheel to be rotatively driven and to convey the conveyance target.

(6) A method of controlling a conveying apparatus including a base, a first wheel and a second wheel that are connected to the base via suspension mechanisms and are rotatable, a first lifter that is able to be lifted and lowered with respect to the base in a direction of a conveyance target and is disposed above the first wheel, a second lifter that is able to be lifted and lowered with respect to the base in the direction of the conveyance target and is disposed above the second wheel, a lower side distance detection unit that detects a first lower side distance between a reference surface of the base below the first lifter and a ground contact surface of the first wheel, and a second lower side distance between the reference surface of the base below the second lifter and a ground contact surface of the second wheel; and a control unit that controls lifting/lowering operations of the first lifter and the second lifter and rotative driving of the first wheel and the second wheel, the method comprising:

causing, by the control unit, the first lifter to be lifted and lowered based on the first lower side distance; causing the second lifter to be lifted and lowered based on the second lower side distance to support a part of the weight of the conveyance target; and causing, by the control unit, the wheel to be rotatively driven and to convey the conveyance target.

(7) A non-transitory computer readable storage medium that stores a computer-readable program which, when executed by one or more computers, causes the one or more computers to perform a method of controlling a conveying apparatus including a base, a wheel that is connected to the base via a suspension mechanism and is rotatable, a lifter that is able to be lifted and lowered with respect to the base in a direction of a conveyance target, a lower side distance detection unit that detects a lower side distance between a reference surface of the base and a ground contact surface of the wheel, and a control unit that controls a lifting/lowering operation of the lifter and rotative driving of the wheel, the method comprising:

causing, by the control unit, the lifter to be lifted and lowered based on the lower side distance and to support a part of the weight of the conveyance target; and causing the wheel to be rotatively driven and to convey the conveyance target.

(8) A non-transitory computer readable storage medium that stores a computer-readable program which, when executed by one or more computers, causes the one or more computers to perform a method of controlling a conveying apparatus including a base, a wheel that is connected to the base via a suspension mechanism and is rotatable, a lifter that is able to be lifted and lowered with respect to the base in a direction of a conveyance target, a lower side distance detection unit that detects a lower side distance between a reference surface of the base and a ground contact surface of the wheel, and a control unit that controls a lifting/lowering operation of the lifter and rotative driving of the wheel, the method comprising:

causing, by the control unit, the lifter to be lifted; detecting a first state in which the lifter comes into contact with the conveyance target when the absolute value of a temporal rate of change in the lower side distance becomes a first predetermined value or greater; then detecting a second state in which the conveyance target rises above the ground contact surface of the wheel when the absolute value of the temporal rate of change in the lower side distance becomes smaller than a second predetermined value; and causing, by the control unit after the second state is detected, the lifter to be lowered to further increase the lower side distance than the lower side distance at the time the second state is detected, and to support a part of the weight of the conveyance target.

(9) A non-transitory computer readable storage medium that stores a computer-readable program which, when executed by one or more computers, causes the one or more computers to perform a method of controlling a conveying apparatus including a base, a first wheel and a second wheel that are connected to the base via suspension mechanisms and are rotatable, a first lifter that is able to be lifted and lowered with respect to the base in a direction of a conveyance target and is disposed above the first wheel, a second lifter that is able to be lifted and lowered with respect to the base in the direction of the conveyance target and is disposed above the second wheel, a lower side distance detection unit that detects a first lower side distance between a reference surface of the base below the first lifter and a ground contact surface of the first wheel, and a second lower side distance between the reference surface of the base below the second lifter and a ground contact surface of the second wheel, and a control unit that controls lifting/lowering operations of the first lifter and the second lifter and rotative driving of the first wheel and the second wheel, the method comprising:

causing, by the control unit, the first lifter to be lifted and lowered based on the first lower side distance; causing the second lifter to be lifted and lowered based on the second lower side distance to support a part of the weight of the conveyance target; and causing, by the control unit, the wheel to be rotatively driven and to convey the conveyance target.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A conveying apparatus comprising:
   a base;
   a wheel that is connected to the base via a suspension mechanism and is rotatable;
   a lifter that is able to be lifted and lowered with respect to the base in a direction of a conveyance target;
   a lower side distance detection unit that detects a lower side distance between a reference surface of the base and a ground contact surface of the wheel; and
   a control unit that controls a lifting/lowering operation of the lifter and rotative driving of the wheel,
   wherein the control unit causes the lifter to be lifted and lowered based on the lower side distance and to support a part of a weight of the conveyance target, and causes the wheel to be rotatively driven and to convey the conveyance target.

2. The conveying apparatus according to claim 1,
   wherein the control unit causes the lifter to be lifted, detects a first state in which the lifter comes into contact with the conveyance target, and then detects a second state in which the conveyance target rises above the ground contact surface of the wheel.

3. The conveying apparatus according to claim 2,
   wherein the control unit detects the first state when an absolute value of a temporal rate of change in the lower side distance becomes a first predetermined value or greater.

4. The conveying apparatus according to claim 2,
   wherein the control unit detects the second state when an absolute value of a temporal rate of change in the lower side distance becomes smaller than a second predetermined value.

5. The conveying apparatus according to claim 2, further comprising:
   an upper side distance detection unit that detects an upper side distance between the reference surface of the base and an upper surface of the lifter.

6. The conveying apparatus according to claim 5,
   wherein the control unit detects the first state when an absolute value of a temporal rate of change in a sum of the lower side distance and the upper side distance becomes smaller than a third predetermined value.

7. The conveying apparatus according to claim 5,
   wherein the control unit detects the second state when an absolute value of a temporal rate of change in a sum of the lower side distance and the upper side distance becomes a fourth predetermined value or greater.

8. The conveying apparatus according to claim 2,
   wherein after the lifter is lifted and the second state is detected, the control unit causes the lifter to be lowered to further increase the lower side distance than the lower side distance at a time the second state is detected, and to support a part of the weight of the conveyance target.

9. The conveying apparatus according to claim 1,
   wherein the base has a PSD sensor, and
   wherein the lower side distance detection unit detects the lower side distance based on an output signal of the PSD sensor.

10. The conveying apparatus according to claim 1,
    wherein the suspension mechanism has an arm which connects the wheel to the base in a vertically movable manner, and a rotation angle sensor which detects a rotation angle of the arm with respect to the base, and
    wherein the lower side distance detection unit detects the lower side distance based on an output signal of the rotation angle sensor.

11. The conveying apparatus according to claim 1,
    wherein the wheel has a first wheel and a second wheel,
    wherein the lifter has a first lifter which is disposed above the first wheel, and a second lifter which is disposed above the second wheel,
    wherein the lower side distance detection unit detects a first lower side distance between the reference surface of the base below the first lifter and the ground contact surface of the first wheel, and a second lower side distance between the reference surface of the base below the second lifter and the ground contact surface of the second wheel, and
    wherein the control unit causes the first lifter to be lifted and lowered based on the first lower side distance, and causes the second lifter to be lifted and lowered based on the second lower side distance.

* * * * *